No. 813,979. PATENTED FEB. 27, 1906.
O. LAUBER & F. STOCK.
ELEVATING MECHANISM AND SIGHTING DEVICE FOR GUNS.
APPLICATION FILED SEPT. 25, 1905.
5 SHEETS—SHEET 1.
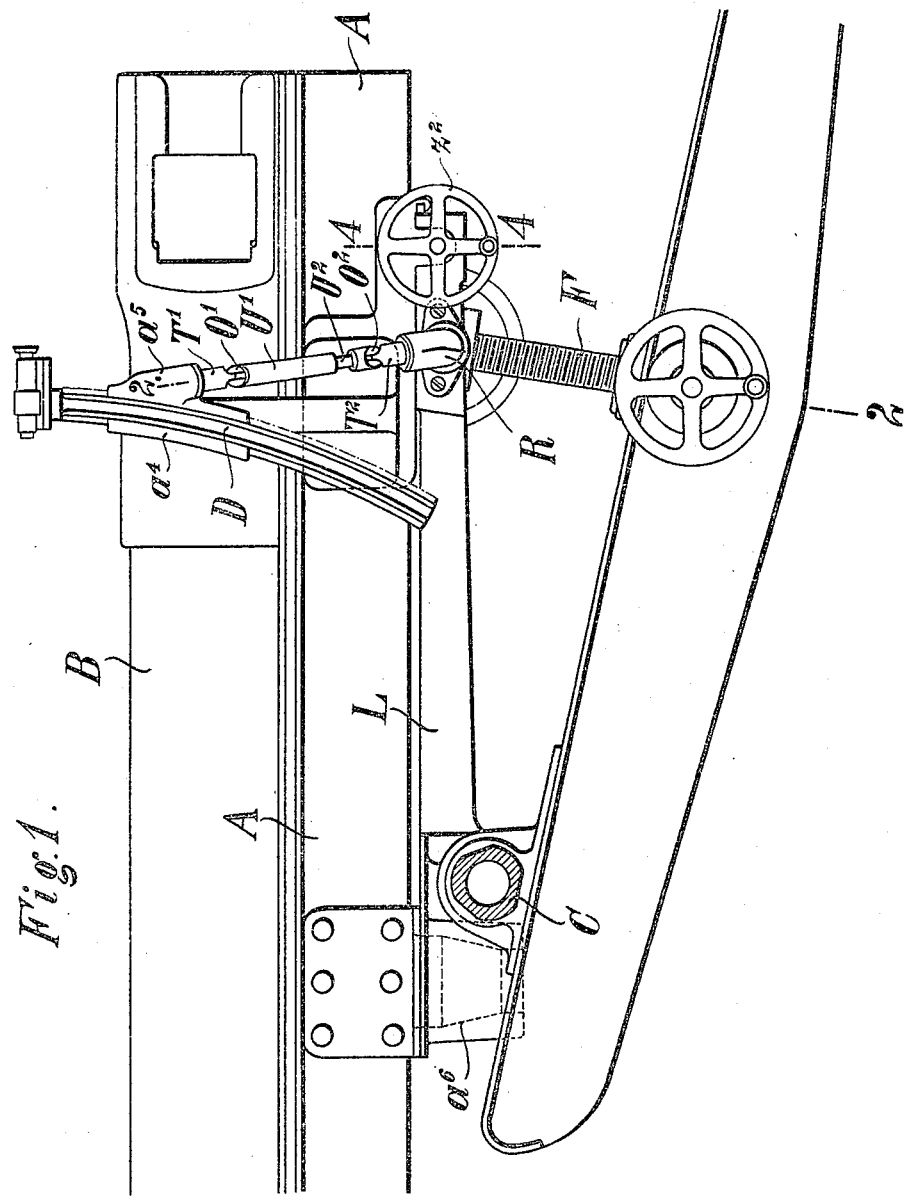

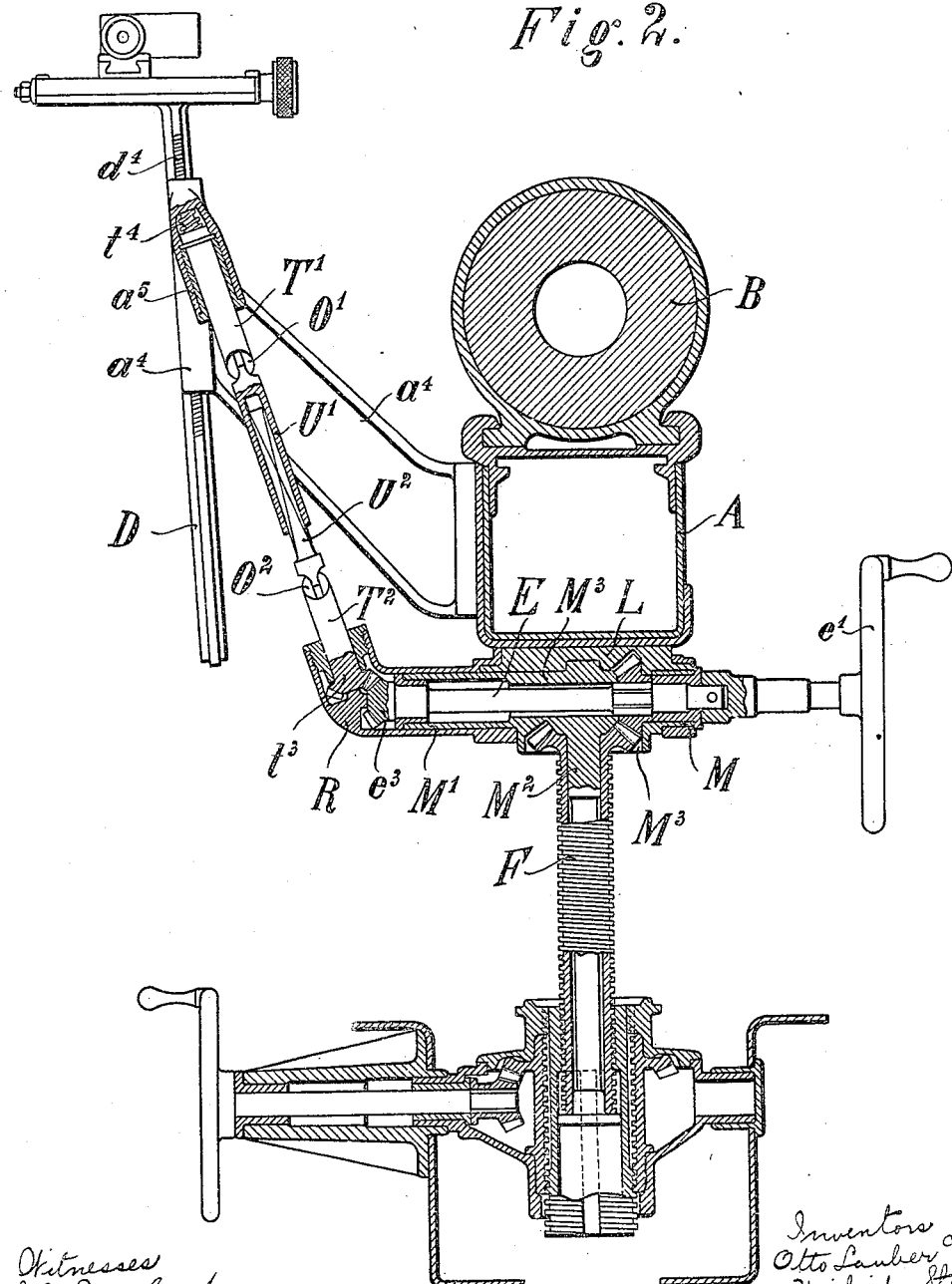

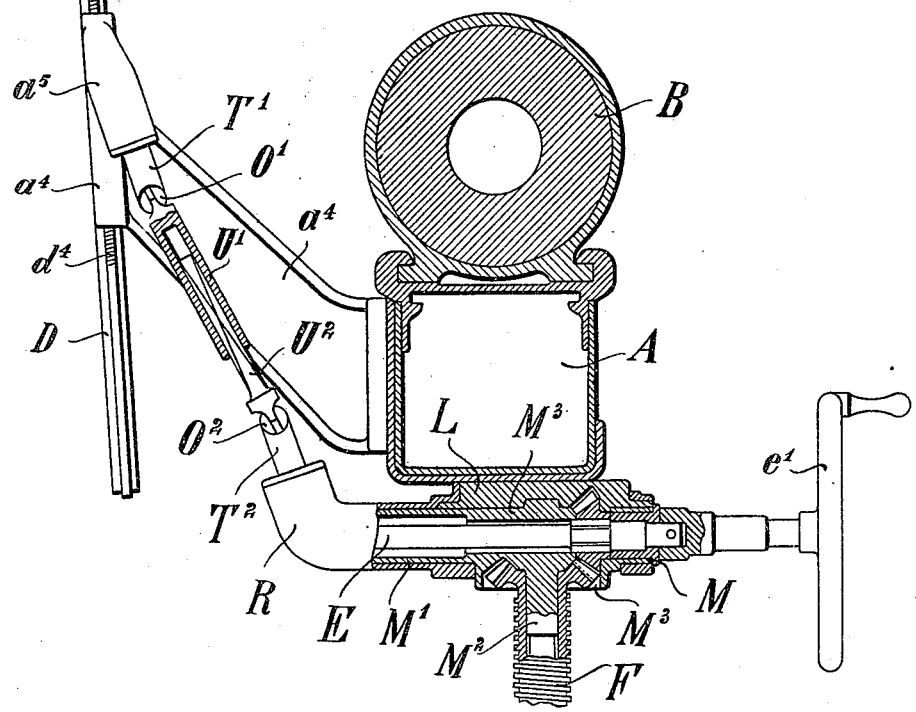
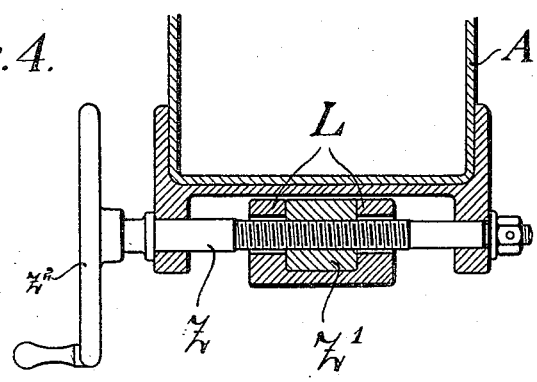

No. 813,979. PATENTED FEB. 27, 1906.
O. LAUBER & F. STOCK.
ELEVATING MECHANISM AND SIGHTING DEVICE FOR GUNS.
APPLICATION FILED SEPT. 25, 1905.
5 SHEETS—SHEET 4.
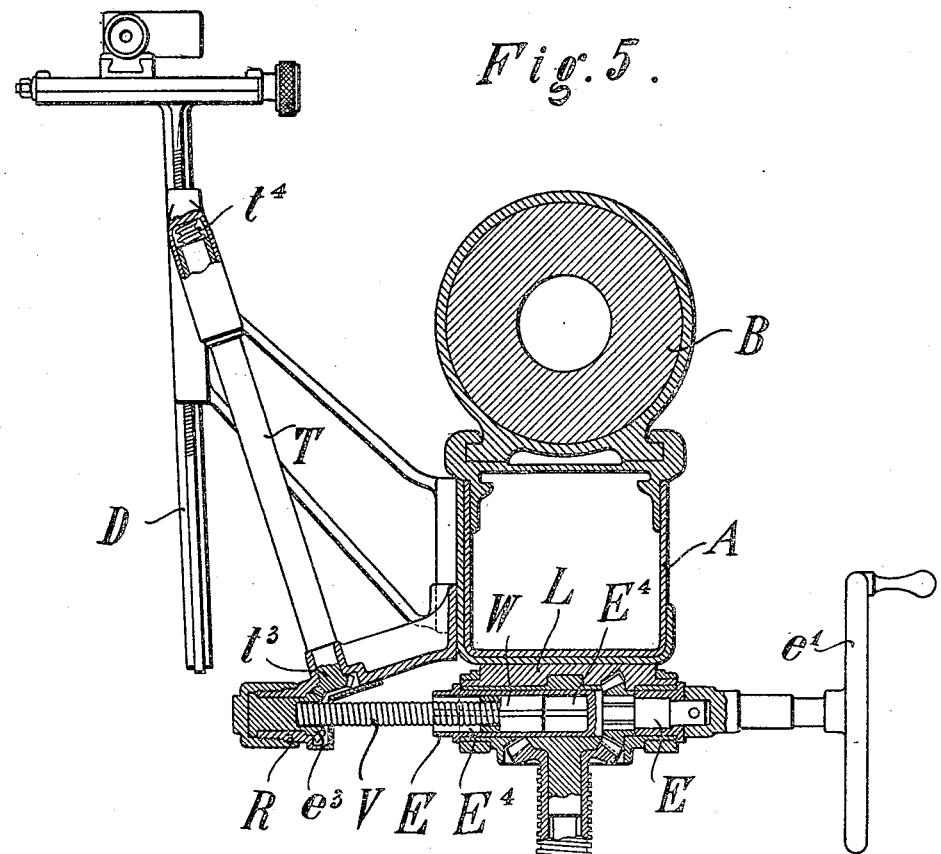
Fig. 5.
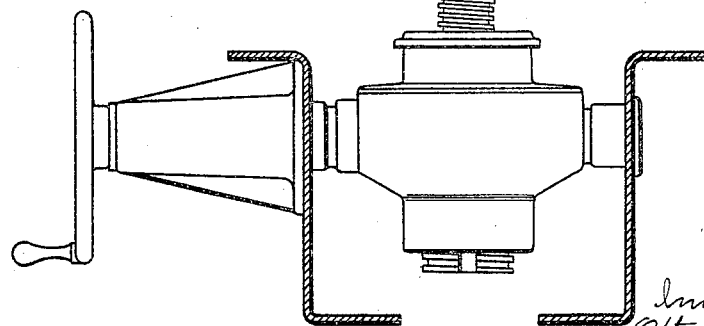

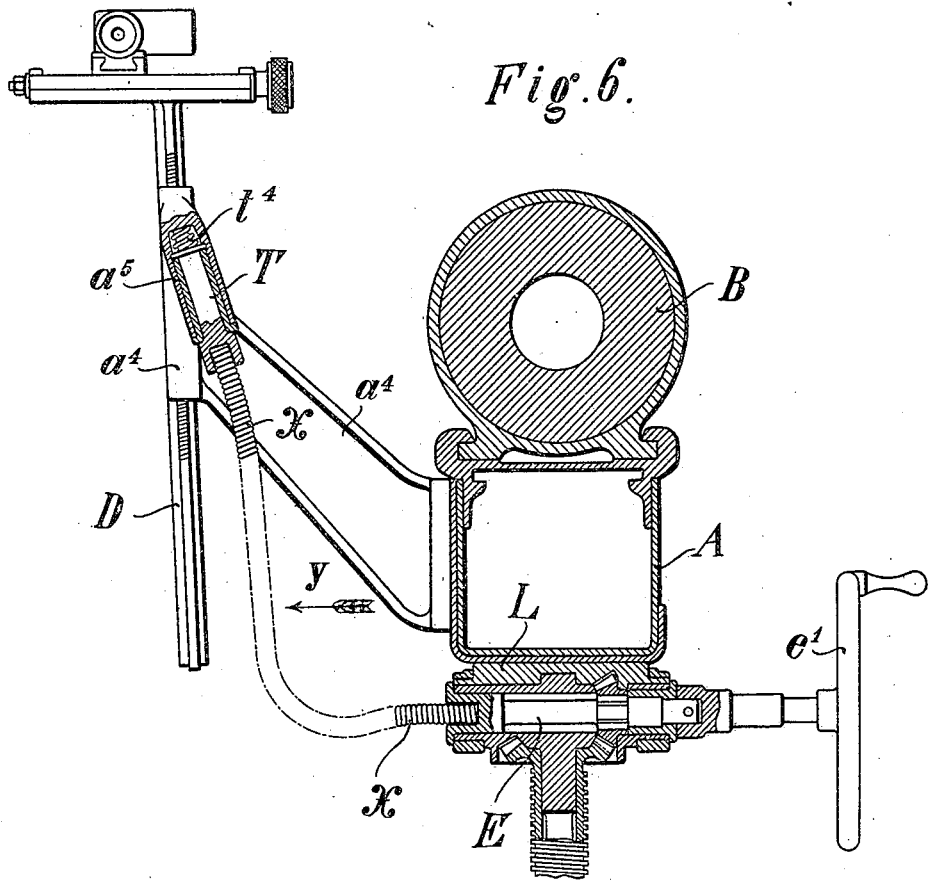

UNITED STATES PATENT OFFICE.

OTTO LAUBER AND FRIEDRICH STOCK, OF ESSEN-ON-THE-RUHR, GERMANY, ASSIGNORS TO FRIED. KRUPP AKTIENGESELLSCHAFT, OF ESSEN-ON-THE-RUHR, GERMANY.

ELEVATING MECHANISM AND SIGHTING DEVICE FOR GUNS.

No. 813,979.     Specification of Letters Patent.     Patented Feb. 27, 1906.

Application filed September 25, 1905. Serial No. 280,100.

*To all whom it may concern:*

Be it known that we, OTTO LAUBER and FRIEDRICH STOCK, subjects of the German Emperor, residing at Essen-on-the-Ruhr, Germany, have invented a certain new and useful Improvement in Elevating Mechanism and Sighting Devices for Guns, of which the following is a specification.

The present invention relates to guns with screw elevating mechanism and sight device adjustably arranged on the cradle, as described in the United States patent application, Serial No. 252,365; and the object of the invention is to make the independent sight-line attachment applicable to guns in which the cradle swings laterally during the horizontal training of the gun.

In the accompanying drawings three embodiments of the invention are shown by way of example.

Figure 1 is a side view of one embodiment. Fig. 2 is a section on the line 2 2, Fig. 1, on an enlarged scale. Fig. 3 is a view corresponding to Fig. 2 with changed position of some parts. Fig. 4 is a section on the line 4 4, Fig. 1, on an enlarged scale. Fig. 5 is a view corresponding to Fig. 2 of the second embodiment, and Fig. 6 is a similar view of the third embodiment.

Reference will first be had to the embodiment shown in Figs. 1 to 4. The cradle A, which carries the gun-barrel B, rests on the cradle-support L, which is swingingly mounted on the wheel-axle C, Fig. 1, and connected with the cradle through the medium of the horizontal-training mechanism Z Z $z^2$, Figs. 1 and 4, and the vertical trunnion $a^6$, Fig. 1, in the customary manner. The elevating mechanism, the sight-post D, its guide-piece $a^4$, and the worm $t^4$, Fig. 2, which meshes with the teeth $d^4$ on the sight-post, are constructed and arranged in the same manner as in the gun described in the application Serial No. 252,365. The shaft E of the hand-wheel $e'$, by means of which rotation is simultaneously imparted to the screw of the elevating mechanism and to the worm $t^4$ for adjusting the sight-post D, is, however, rotatably and non-slidably arranged on the cradle-carrier L and not on the cradle A. Furthermore, the T-shaped piece M M' $M^2$ $M^3$, which forms the bearing for the shaft E and the shank $M^2$ of which forms the bearing for the screw-spindle F, is swingingly arranged in the cradle-carrier L. (See in particular Figs. 2 and 3.) In order to permit of the cradle A, with the worm $t^4$, being swung relatively to the cradle-support L through the medium of the horizontal-training mechanism and still maintain driving connection between the hand-wheel $e'$ and the worm $t^4$, a jointed and longitudinally-movable coupling is inserted in the shaft connection between the hand-wheel and the worm. The coupling consists of two gimbal-joints O' and $O^2$ of known construction and two telescoping shafts U' and $U^2$. The shaft $U^2$ is of non-circular cross-section, and the interior of the shaft U' is of a shape similar to that of the shaft $U^2$, so as to permit of longitudinal movement of the two shafts, but prevent rotation of the shafts relatively to one another. In the drawings the shaft $U^2$ is shown prismatic. One of the gimbal-joints O' is inserted between the shaft U' and the worm-shaft T', which is journaled in the projection $a^5$ on the guide-piece $a^4$. The other gimbal-joint $O^2$ connects the shaft $U^2$ with the shaft $T^2$ of the cone-wheel $t^3$, Fig. 3, which meshes with the cone-wheel $e^3$ on the shaft E. The casing R, which surrounds the cone-wheels $t^3$ $e^3$ and a bearing for the shaft $T^2$, is secured on the cradle-support L.

If by the turning of the hand-wheel $Z^2$ of the horizontal-training mechanism the cradle A is swung relatively to the cradle-support L on the trunnion $a^6$ from the zero position, (shown in Fig. 2,) the shaft $U^2$ moves longitudinally within the shaft U' and a movement takes place simultaneously in the two gimbal-joints O' and $O^2$. When the turning is completed, the relative positions of the parts have been changed—such, for instance, as shown in Fig. 3. It is now evident that when the shaft E is rotated by means of the hand-wheel $e'$ the said movement will in any relative positions of the cradle and cradle-support be transmitted to the worm $t^4$ through the medium of the cone-wheels $e^3$ $t^3$, the shaft $T^2$, the coupling $O^2$ $U^2$ U' O', and the shaft T'. The manipulation and the mode of operation of the entire device are the same as in the gun described in the application Serial No. 252,365.

The embodiment shown in Fig. 5 differs from the device as above described mainly in having the worm $t^4$ directly connected to the cone-wheel $t^3$ by means of a rigid shaft T and in having a jointed and longitudinally-movable coupling inserted between the shaft E of the hand-wheel $e'$ and the cone-wheel $e^3$, which meshes with the cone-wheel $t^3$. Furthermore, the housing R, in which the shaft T and the cone-wheel $e^3$ are journaled, is secured to the cradle A. The coupling in this instance serves the same purpose as that above described and consists of a short flexible shaft V, a prismatic slide W, and a prismatic guide-piece $E^4$, provided in the shaft E and in which the slide W moves. The flexible shaft V is in the customary manner composed of spirally-wound wires and is rigidly connected to the slide W and to the hub of the cone-wheel $e^3$. If the cradle A is swung relatively to the cradle-support L by means of the horizontal-training mechanism, the slide W is shoved from the central position (shown in Fig. 5) to the right or to the left in the guide-piece $E^4$ of the shaft E. At the same time the flexible shaft V becomes slightly curved, because the end which is secured to the cone-wheel $e^3$ moves in a circular path when the cradle is swung, while the other end of the shaft V, which is secured to the slide W, moves in a straight path. It is evident that also in this embodiment a rotation of the shaft E will be transmitted to the shaft T and the worm $t^4$ in any position of the cradle relatively to the cradle-support.

In the embodiment shown in Fig. 6 the worm-shaft T, which is journaled in the projection $a^5$ on the guide-piece $a^4$, is directly connected by means of a flexible shaft X with the shaft E of the hand-wheel $e'$, which is journaled in the cradle-support L. The flexible shaft is of known construction and is of sufficient length to transmit the rotation of the shaft E to the shaft T also in the case where the cradle is swung by means of the horizontal-training mechanism relatively to the cradle-support the largest angle permissible in the direction of the arrow $y$.

Having thus described the invention, what is claimed as new therein is—

1. In a gun provided with means for simultaneously adjusting its sight and elevating mechanism, also means imparting a horizontal training movement to the upper part of the mount; a yielding connection through which adjusting movement is imparted to the sight.

2. In a gun having an upper carriage movable horizontally on the lower carriage, a sight supported from the upper carriage, and means mounted on the lower carriage for simultaneously elevating the gun and shifting its sight; a yielding connection through which the shifting movement is imparted to the sight, whereby the control of the said sight is maintained at any horizontal adjustment of the upper carriage.

3. In a gun having an elevating mechanism, and an adjustable sight mounted respectively on the upper and lower portions of the carriage and means for relatively adjusting said portions of the carriage horizontally for the training of the gun; rotating shafts mounted respectively on the support for the sight and the lower portion of the carriage, having connections through which they are respectively adapted to adjust the elevating mechanism and said sight, and a yielding connection between said shafts whereby they may be driven simultaneously.

4. In a gun having horizontal training movement, a vertically-adjustable sight and means for elevating the gun, rotary shafts controlling the elevating and sight-adjusting means, and a yielding connection between said shafts consisting of a telescoping shaft and joints between the respective parts of the telescoping shafts and the shafts to be connected.

The foregoing specification signed at Düsseldorf this 11th day of September, 1905.

OTTO LAUBER.
FRIEDRICH STOCK.

In presence of—
WILLIAM ESSENWEIN,
ERNEST BRODRE.